United States Patent
De Grimaudet De Rochebouet

(10) Patent No.: US 12,188,812 B2
(45) Date of Patent: Jan. 7, 2025

(54) METHOD FOR MONITORING THE OPERATION OF A MACHINE GENERATING VIBRATIONS AND DEVICE FOR THE IMPLEMENTATION OF SUCH A METHOD

(71) Applicant: CARTESIAM, Toulon (FR)

(72) Inventor: François De Grimaudet De Rochebouet, Toulon (FR)

(73) Assignee: STMicroelectronics International N.V., Geneva (CH)

( * ) Notice: Subject to any disclaimer, the term of this patent is extended or adjusted under 35 U.S.C. 154(b) by 834 days.

(21) Appl. No.: 17/277,126

(22) PCT Filed: Sep. 12, 2019

(86) PCT No.: PCT/EP2019/074339
§ 371 (c)(1),
(2) Date: Mar. 17, 2021

(87) PCT Pub. No.: WO2020/058075
PCT Pub. Date: Mar. 26, 2020

(65) Prior Publication Data
US 2022/0011154 A1    Jan. 13, 2022

(30) Foreign Application Priority Data

Sep. 18, 2018    (FR) ...................... 1858412

(51) Int. Cl.
*G01H 1/00*    (2006.01)
*G01M 7/02*    (2006.01)
*G05B 23/02*    (2006.01)
*G06N 20/00*    (2019.01)

(52) U.S. Cl.
CPC ............ *G01H 1/003* (2013.01); *G01M 7/025* (2013.01); *G05B 23/0235* (2013.01); *G05B 23/024* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,054,337 B2 | 7/2021 | Knaup | |
| 2014/0324739 A1 | 10/2014 | Claussen | |
| 2017/0089577 A1* | 3/2017 | DeSilva | ................. F23Q 23/10 |

FOREIGN PATENT DOCUMENTS

| | | |
|---|---|---|
| CN | 101038239 A | 9/2007 |
| CN | 101995290 A | 3/2011 |
| CN | 103308292 A | 9/2013 |
| CN | 104112282 A | 10/2014 |

(Continued)

OTHER PUBLICATIONS

KR International Search Report as issued in International Patent Application No. PCT/EP2019/074339, dated Sep. 30, 2019.

*Primary Examiner* — Walter L Lindsay, Jr.
*Assistant Examiner* — Geoffrey T Evans
(74) *Attorney, Agent, or Firm* — Slater Matsil, LLP

(57) ABSTRACT

A method for monitoring the operation of a machine that generates vibrations, includes a learning phase in which a knowledge base containing vibrational signatures representative of the operation of the machine is generated, and a monitoring phase in which the vibrations of the machine are compared to the knowledge base so as to detect an anomaly in the machine.

20 Claims, 2 Drawing Sheets

(56) References Cited

FOREIGN PATENT DOCUMENTS

| | | |
|---|---|---|
| CN | 104317975 A | 1/2015 |
| CN | 105866250 A | 8/2016 |
| CN | 106960285 A | 7/2017 |
| CN | 108470084 A | 8/2018 |
| CN | 108496123 A | 9/2018 |
| EP | 1978490 A1 | 10/2008 |
| FR | 3 032 273 A1 | 8/2016 |
| JP | H0552712 A | 3/1993 |
| JP | 2002318154 A | 10/2002 |
| JP | 2006064326 A | 3/2006 |
| KR | 20090119471 A | 11/2009 |
| WO | 2011023596 A1 | 3/2011 |
| WO | WO 2015/086959 A1 | 6/2015 |
| WO | 2018074721 A1 | 4/2018 |
| WO | WO 2018/119489 A1 | 7/2018 |

* cited by examiner

METHOD FOR MONITORING THE OPERATION OF A MACHINE GENERATING VIBRATIONS AND DEVICE FOR THE IMPLEMENTATION OF SUCH A METHOD

CROSS-REFERENCE TO RELATED APPLICATIONS

This application is the U.S. National Stage of PCT/EP2019/074339, filed Sep. 12, 2019, which in turn claims priority to French patent application number 1858412 filed Sep. 18, 2018. The content of these applications are incorporated herein by reference in their entireties.

TECHNICAL FIELD OF THE INVENTION

The present invention relates to a method for monitoring the operation of a machine generating vibrations and a device for the implementation of such a method.

TECHNOLOGICAL BACKGROUND OF THE INVENTION

A machine such as a motor, a pump, a compressor, a fan or a turbine generates vibrations while it is in operation. The profile of these vibrations, notably as regards the amplitude and the frequency, may change when parts of the machine are unbalanced, misaligned, poorly adjusted or worn. In this case, if nothing is done, the machine risks being damaged. That is why it is important to monitor the machine in order to reveal a potential change in the profile of the vibrations. Anomalies may thus be identified before they become too serious and lead to additional damage or unplanned interruptions.

The machine may be monitored by means of a vibration sensor. To detect anomalies, currently used vibration sensors are based on amplitude threshold exceedances and/or variations in dominant frequencies. However, this way of proceeding has the drawback of being limited. Indeed, this approach notably does not make it possible to detect variations occurring at frequencies not provided for during the initial configuration of the sensor, but only those occurring at certain predetermined frequencies. Consequently, it may happen that certain anomalies are not detected.

SUMMARY OF THE INVENTION

It ensues from the preceding that there exists a need to improve the detection and the analysis of vibrations of a machine.

The present invention aims to respond to this need by proposing, according to a first aspect of the invention, a method for monitoring the operation of a machine generating vibrations, the method comprising:
 a learning phase comprising the following steps:
  acquiring in the temporal domain a first vibratory signal generated by the machine;
  determining a first vibratory signature corresponding to the first vibratory signal;
  determining a first level of similarity between the first vibratory signature and a knowledge in which vibratory signatures are saved;
  comparing the first level of similarity with a first predetermined threshold;
  if the first level of similarity is less than the first threshold, saving the vibratory signature in the knowledge;
  the steps of the learning phase being periodically repeated so as to constitute the knowledge;
 a monitoring phase comprising the following steps:
  acquiring in the temporal domain a second vibratory signal generated by the machine;
  determining a second vibratory signature corresponding to the second vibratory signal;
  determining a second level of similarity between the second vibratory signature and the knowledge;
  comparing the second level of similarity with a second predetermined threshold;
  if the second level of similarity is less than the second threshold, generating a warning, the second vibratory signature being considered as indicative of an anomaly;
  the steps of the monitoring phase being periodically repeated;
  the monitoring method passing in an autonomous manner from the learning phase to the monitoring phase when the knowledge is considered as being constituted.

Firstly, the monitoring method learns to recognise in an autonomous manner the vibrations characteristic of normal operation of the machine. Next, secondly, the monitoring method regularly acquires and compares vibrations in order to determine if the machine deviates from its normal operation. Thanks to the invention, it is thus possible to detect efficiently if an anomaly occurs and, in this case, to trigger a warning.

In addition, during its learning phase, the monitoring method only saves vibratory signatures sufficiently different from signatures already learnt, that is to say signatures already saved in the knowledge, which makes it possible to avoid redundancy of information and to limit the amount of data stored during the learning without decreasing the quality of the learning. The monitoring method may then be implemented on devices constrained in terms of resources, such as for example a microcontroller.

According to an embodiment, the learning phase further comprises a specific step of comparison of the first level of similarity of a predetermined number M of vibratory signatures determined consecutively with a specific predetermined threshold greater than the first threshold, the knowledge being considered as being constituted if the first level of similarity of the last M vibratory signatures is greater than the specific threshold.

According to an embodiment, the monitoring phase comprises a so-called "discovery" period during which the second vibratory signature considered as indicative of an anomaly is saved in the knowledge.

According to an embodiment, the monitoring phase comprises a step of comparison of the duration of the anomaly with a predetermined duration, the anomaly being proven if the duration of the anomaly is greater than the predetermined duration.

According to an embodiment, the monitoring phase further comprises a step of transmission of the warning.

According to an embodiment, the monitoring phase further comprises a step of transmission of an analysis report carried out periodically.

According to an embodiment, the steps of the learning phase are periodically repeated according to a first repetition period, the steps of the monitoring phase being periodically repeated according to a second repetition period greater than the first repetition period.

According to an embodiment, the vibratory signals are acquired by means of a vibration sensor, the method further comprising an initial step of calibration of the vibration sensor.

According to an embodiment, the second threshold of the second comparison step is less than the first threshold of the first comparison step.

A second aspect of the invention relates to a monitoring device for the implementation of a monitoring method according to the first aspect of the invention, the monitoring device being intended to be installed on a machine generating vibrations, the device comprising:
- a vibration sensor adapted and configured to acquire a vibratory signal;
- a control module adapted and configured to determine a vibratory signature corresponding to the vibratory signal, to determine a level of similarity between the vibratory signature and a knowledge in which vibratory signatures are saved, and to compare the level of similarity with a predetermined threshold;
- a memory adapted and configured to save the vibratory signature.

BRIEF DESCRIPTION OF THE FIGURES

The invention and the different applications thereof will be better understood on reading the description that follows and by examining the figures that accompany it, among which.

The figures are only presented for indicative purposes and in no way limit the invention.

For greater clarity, identical or similar elements are marked by identical reference signs in all of the figures.

DETAILED DESCRIPTION OF AT LEAST ONE EMBODIMENT

Figure 1:
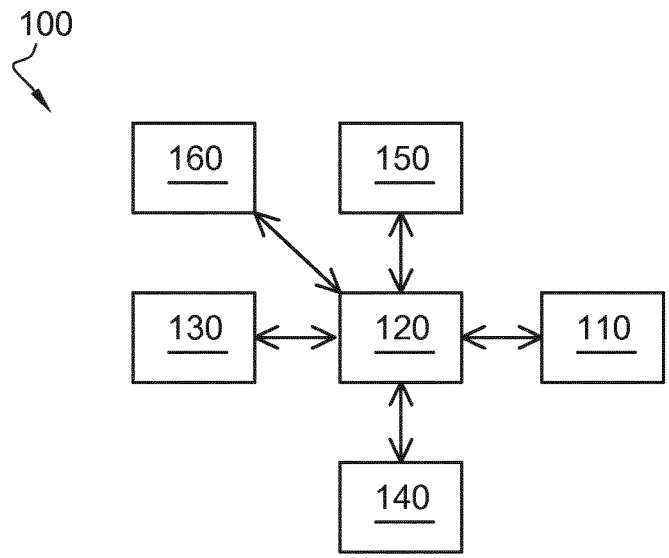
FIG. 1 is a functional diagram of a device for monitoring the operation of a machine generating vibrations, according to an embodiment of the invention.

FIG. 1 represents an embodiment of a monitoring device 100 according to the invention. The monitoring device 100 is intended to be installed on a machine that generates mechanical vibrations while it is in operation. The machine may for example be a motor, a pump, a compressor, a fan or a turbine. The monitoring device 100 comprises a vibration sensor 110, a control module 120, a memory 130, a data transmission module 140, an electrical supply 150 and an activation member 160.

The vibration sensor 110 is adapted and configured to acquire a vibratory signal generated by the machine. The vibration sensor 110 is for example a 3-axis accelerometer. Such an accelerometer can acquire a vibratory signal comprising three components, each corresponding to one axis of the accelerometer. In other words, the vibratory signal may be represented in a three dimensional orthonormal reference frame formed by the three axes of the accelerometer. Advantageously, the three components of the vibratory signal are added together then normalised in order to facilitate the use of the monitoring device 100. Indeed, by proceeding in this manner, the monitoring device 100 may be installed on the machine in any direction.

The vibratory signal obtained by the vibration sensor 110 is transmitted to the control module 120, the role of which is to analyse the vibratory signal received. The control module 120 is notably configured to determine a vibratory signature from the vibratory signal acquired by the vibration sensor 110, as described in greater detail hereafter. The control module 120 comprises for example a microprocessor.

The memory 130 is adapted and configured to save vibratory signatures characteristic of normal operation of the machine. The set of vibratory signatures stored in the memory forms a knowledge.

The data transmission module 140 is adapted and configured to transmit analysis reports in a periodic manner, as well as warnings when anomalies are detected. These data are for example transmitted to a monitoring console which makes it possible to view the analysis reports and to generate warnings. Preferably, the transmission module uses a wireless communication network of IOT (Internet Of Things) type. The IOT network may for example use LoRa technology or Sigfox technology.

The electrical supply 150 supplies the electrical energy necessary for the operation of the monitoring device 100. The electrical supply 150 is advantageously dimensioned so that the monitoring device operates without interruption for an extended period of time, of the order of several years. In order to reduce electrical energy consumption, the monitoring device 100 is advantageously configured to go into sleep mode between each acquisition. The electrical supply 150 comprises for example a battery or a fuel cell.

The activation member 160 may be used to start or stop the monitoring device 100. Advantageously, the monitoring device 100 comprises a single activation member 160, which facilitates the use of the monitoring device 100. Once the activation member 160 is triggered, the monitoring device 100 operates in a completely autonomous manner. The activation member 160 is for example a push button or a switch.

The monitoring device 100 also comprises fastening means (not represented) configured to maintain the monitoring device 100 on the machine. The fastening means may be magnetic elements or adhesive elements.

Figure 2:
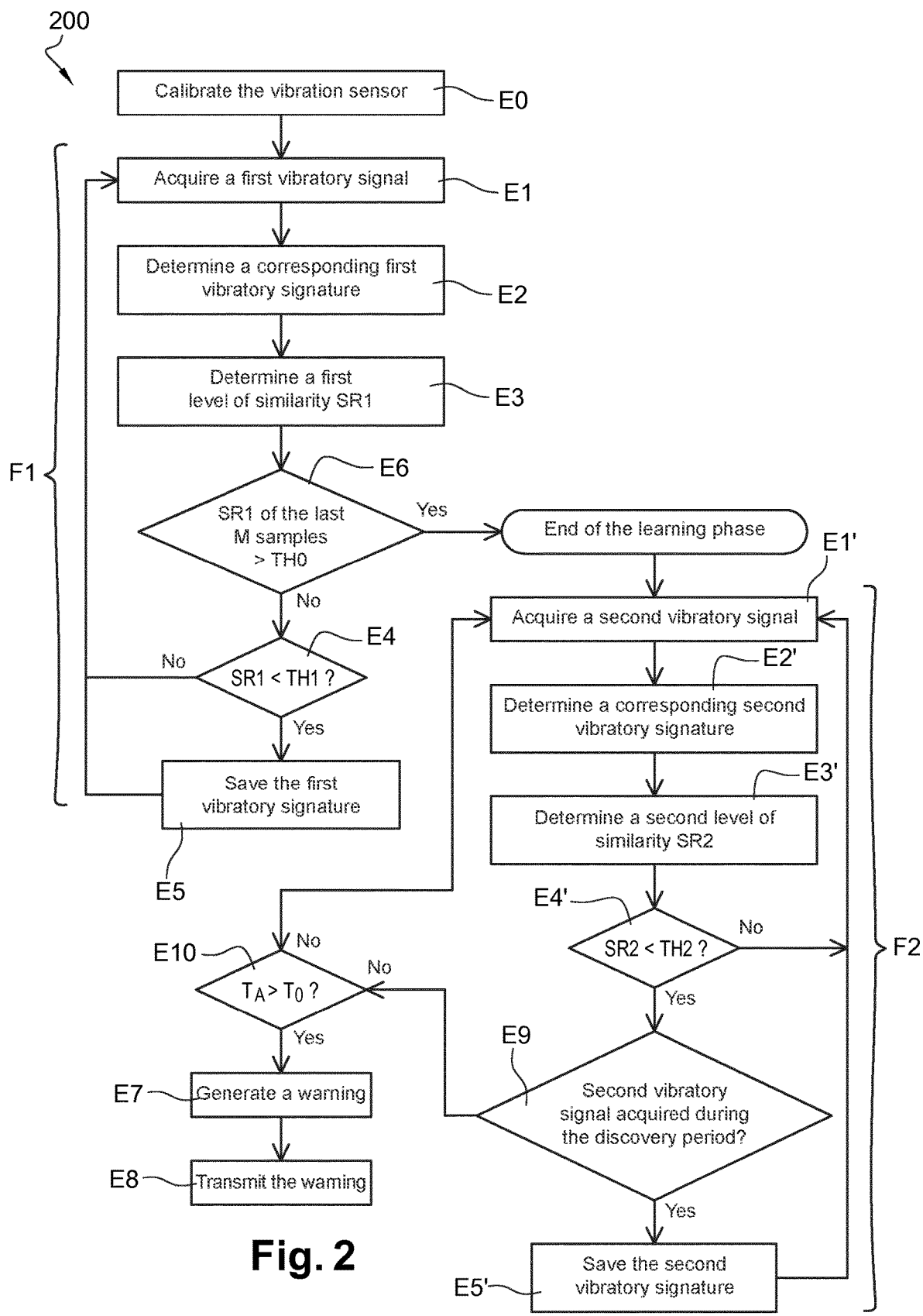
FIG. 2 is a flowchart of a method for monitoring the operation of a machine generating vibrations, according to an embodiment of the invention.

FIG. 2 shows a preferential embodiment of a monitoring method 200 according to the invention. The monitoring method 200 may be implemented by the monitoring device 100 of FIG. 1. The monitoring method 200 comprises a learning phase F1 having the aim of constituting the knowledge and a monitoring phase F2 during which the vibrations of the machine are compared with the knowledge in order to detect differences being able to be indicative of an anomaly in the machine. The anomaly may for example correspond to unbalanced, misaligned, poorly adjusted or worn parts of the machine. The monitoring method 200 may thus be used to carry out predictive maintenance.

The learning phase F1 comprises a first step E1 of acquisition in the temporal domain of a first vibratory signal generated by the machine. The vibratory signal is a sample of the vibrations of the machine corresponding to a first acquisition duration preferably comprised between 1 second and 5 seconds. The first acquisition duration is for example equal to 2 seconds. The first acquisition step E1 is carried out at a sampling frequency that is advantageously parameterised so as to be greater than double the maximum working frequency of the vibration sensor. As a non-limiting example, the accelerometer used in the monitoring device 100 of FIG. 1 is able to measure vibrations at frequencies comprised between 0 Hz and 200 Hz.

The first acquisition step E1 is followed by a first step E2 of determination of a vibratory signature corresponding to the vibratory signal acquired. The vibratory signature is for example determined in the following manner. The vibratory signal in the temporal domain may be transformed into a vibratory signal in the frequency domain, by performing for example a Fourier transform. The vibratory signal in the frequency domain extends over a frequency range which depends on the sampling frequency. This frequency range is divided into a predetermined number of intervals, for example equal to 128 or to 256. A coefficient is assigned to each frequency interval, each coefficient representing the intensity of the vibratory signal in the corresponding frequency interval. The vibratory signature thus comprises a series of values that characterise the vibratory signal taken on the machine.

A first step E3 is next carried out of determination of a first level of similarity SR1 between the vibratory signature that has just been determined and the vibratory signatures present in the knowledge. Methods for calculating the level of similarity are known to those skilled in the art and thus will not be described in greater detail. Such methods are notably used in the fingerprint recognition field. As a non-limiting example, the level of similarity may be determined by a distance calculation in an N-dimension space where N is here equal to the number of coefficients that the vibratory signature comprises. The level of similarity may be expressed in percentage.

The first level of similarity SR1 is next compared, in the course of a first comparison step E4, with a first predetermined threshold TH1. If the first level of similarity SR1 is less than the first threshold TH1, the first vibratory signature is considered as not being known. In this case, the first vibratory signature is saved in the knowledge in the course of a first saving step E5. Conversely, if the first level of similarity SR1 is greater than the first threshold TH1, the first vibratory signature is considered as being known. In this case, the first vibratory signature is not saved in the knowledge. The first threshold TH1 is for example set at 90%.

The steps of the learning phase F1 are periodically repeated according to a first repetition period. The knowledge, which is initially empty, is thus constituted progressively. The first repetition period is for example equal to one minute. In other words, a new vibratory signal is sampled every minute. Preferably, the first repetition period is regular.

Advantageously, the learning phase F1 also comprises a specific step of comparison E6 of the first level of similarity of a predetermined number M of vibratory signatures determined consecutively with a specific predetermined threshold TH0 greater than the first threshold TH1. The specific comparison step E6 is for example carried out before the first step E4 of comparison of the level of similarity with the first threshold TH1. If the first level of similarity SR1 of the last M vibratory signatures is greater than the second threshold TH0, the knowledge is considered as being constituted. In this case, the learning phase F1 ends and the monitoring method 200 passes to the monitoring phase F2. If this is not the case, that is to say if the level of similarity of at least one of the last M vibratory signatures is less than the second threshold TH0, the learning phase F1 continues. As a non-limiting example, the learning phase F1 may end when the level of similarity of the last ten vibratory signatures, which thus correspond to the last ten vibratory signals acquired, is above 98%. The duration of the learning phase F1 depends on the machine on which the monitoring device 100 is installed but, in all cases, the learning phase F1 is completed in an autonomous manner.

According to another embodiment, the knowledge may be considered as being constituted at the end of a predetermined learning duration. The learning duration may in this case be parameterised as a function of the type of machine on which the monitoring device 100 is intended to be installed.

Advantageously, the learning phase F1 is preceded by an initial step E0 of calibration of the vibration sensor. Indeed, the vibration sensor may comprise several nominal operating ranges. As a non-limiting example, the accelerometer used in the monitoring device 100 of FIG. 1 comprises four nominal operating ranges which extend from 0 G to respectively 2, 4, 8 or 16 G. The aim of the calibration step E0 is to determine which nominal range to use so as to obtain the most relevant data.

Figure 3:
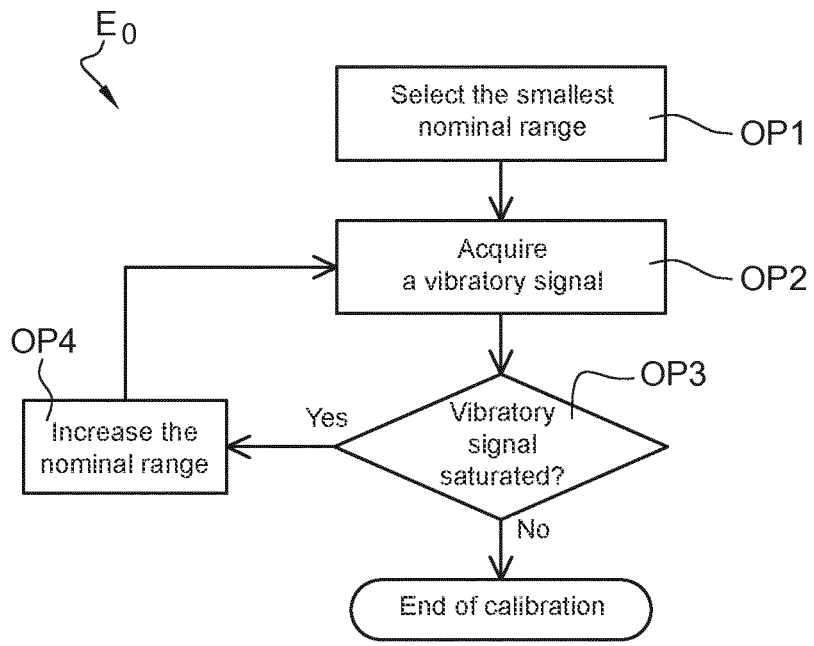
FIG. 3 is a flowchart of a step of calibration of the monitoring method of FIG. 2.

FIG. 3 shows a flowchart of the calibration step E0 of the monitoring method 200 of FIG. 2. The calibration step E0 begins with a first operation OP1 of selection of the smallest nominal range of the vibration sensor. A vibratory signal is next taken on the machine in the course of a second operation OP2. In the course of a third operation OP3, it is verified if the vibratory signal is saturated. If such is the case, the nominal range of the vibration sensor is increased in the course of a fourth operation OP4. If not, the selected nominal range is appropriate and the calibration step E0 ends. Preferably, the second operation OP2 of acquisition of the vibratory signal is carried out over a relatively long duration, for example over a duration of one minute, so as to obtain a sufficiently representative sample of vibrations.

The learning phase F1 is followed by the monitoring phase F2 which comprises a second step E1' of acquisition of a second vibratory signal, a second step E2' of determination of a second vibratory signature corresponding to the second vibratory signal and a second step E3' of determination of a second level of similarity of the second vibratory signature. These second steps E1', E2', E3' carried out during the monitoring phase F2 are similar to the first steps E1, E2, E3 of same name carried out during the learning phase F1. The duration of the second acquisition step E1' is preferably identical to the duration of the first acquisition step E1. Alternatively, the duration of the acquisition steps E1, E1' may be different.

During the monitoring phase F2, the second level of similarity SR2 is compared, in the course of a second comparison step E4', with a second predetermined threshold TH2 less than the first threshold TH1. If the second level of similarity SR2 is greater than the second threshold TH2, it is considered that the second vibratory signature is known. If the second level of similarity SR' is less than the second threshold TH2, it is considered that the second vibratory signature is not known and is indicative of an anomaly at the level of the machine. The second threshold TH2 is for example set at 80%.

The monitoring phase F2 comprises a step E7 of generation of a warning when an anomaly is recognised. The warning may next be transmitted in the course of a transmission step E8. An operator may thus be warned that an anomaly at the level of the machine has been detected.

Apart from the sending of a warning, the monitoring phase F2 may also comprise a step of transmission (not represented) of an analysis report of the vibrations of the machine. The analysis report comprises for example information relative to the frequency distribution and to the amplitude of the vibrations and in particular potential anomalies. The analysis report may also indicate the operating and stoppage times of the machine. The transmission of the analysis report is carried out regularly, for example every two hours.

In this preferential embodiment, the monitoring phase F2 comprises a so-called "discovery" period which starts at the same time as the monitoring phase F2. Advantageously, the monitoring phase F2 comprises a verification step E9 carried out before generating the warning and during which it is verified if the second vibratory signal, corresponding to the second vibratory signature indicative of an anomaly, has been acquired during the discovery period. If this is not the case, the warning may be generated. If the second vibratory signal has indeed been acquired during the discovery period, the second vibratory signature is saved in the knowledge in the course of a saving step E5' and the warning is not generated. In other words, it is considered that it is not really an anomaly but vibrations characteristic of the normal operation of the machine which did not show up during the learning phase F1. Thus, in the course of the discovery period, the knowledge may be enriched. The discovery period is particularly useful for machines having operating cycles that are variable over time. This is the case for example of air compressors, which have vibratory changes at the start and end of cycle. Preferably, the discovery period has a predetermined duration for example equal to seven days.

Advantageously, the monitoring phase F2 comprises a step E10 of comparison of the duration of the anomaly $T_A$ with a predetermined duration $T_0$. If the duration of the anomaly $T_A$ is greater than the predetermined duration $T_0$, the warning is generated. In this case, it is in fact considered that the anomaly is proven. If the duration of the anomaly $T_A$ is less than the predetermined duration $T_0$, the warning is not generated. This comparison step E9 makes it possible to avoid triggering warnings in an inadvertent manner, for example when the machine suffers a one-off event, such as a shock, which could lead to a modification of the vibrations.

The steps of the monitoring phase F2 are periodically repeated according to a second repetition period. Advantageously, the second repetition period is greater than the first repetition period in order to minimise electrical energy consumption and thus prolong the duration of operation of the monitoring device 100. The second repetition period is for example equal to two minutes. The second repetition period may be dynamic, that is to say that it can vary, and in particular decrease, when an anomaly is detected.

An advantage is to enable a more precise characterisation of the anomaly, notably with regard to its duration.

Naturally, the invention is not limited to the embodiments described with reference to the figures and alternatives could be envisaged without going beyond the scope of the invention.

The invention claimed is:

1. A method for monitoring the operation of a machine generating vibrations, the method comprising:
    collecting, during a learning phase, a first vibratory signal generated by the machine during its normal operation, the first vibratory signal being collected in the time domain, the learning phase repeated periodically;
    applying a transformation to the first vibratory signal to create a first vibratory signature;
    creating a knowledge base by recording the first vibratory signature therein, the recording being in response to a first similarity rate between the first vibratory signature and each vibratory signature in the knowledge base being less than a predetermined first threshold;
    collecting, during a monitoring phase, a second vibratory signal generated by the machine in the time domain, the machine autonomously switching from the learning phase to the monitoring phase in response to a creation of the knowledge base;
    applying a transformation to the second vibratory signal to create a second vibratory signature; and
    generating a warning in response to a second similarity rate between the second vibratory signature and each of the vibratory signatures in the knowledge base being less than a predetermined second threshold, the warning indicating an anomaly related to the second vibratory signature, wherein the predetermined second threshold is less than the predetermined first threshold.

2. The method according to claim 1, wherein the learning phase further comprises comparing the first similarity rate of a predetermined number M of vibratory signatures determined consecutively with a predetermined specific threshold greater than the predetermined first threshold, the knowledge base considered as being created in response to the first similarity rate of the last M vibratory signatures being greater than the predetermined specific threshold.

3. The method according to claim 1, wherein the monitoring phase comprises a discovery phase during which a third vibratory signature that is considered as revealing the anomaly being recorded in the knowledge base without generating the warning.

4. The method according to claim 1, wherein the monitoring phase comprises comparing a duration of the anomaly with a predetermined duration, the anomaly being acknowledged in response to the duration being greater than the predetermined duration.

5. The method according to claim 1, wherein the monitoring phase further comprises transmitting the warning.

6. The method according to claim 1, wherein the monitoring phase further comprises periodically transmitting an analysis report.

7. The method according to claim 1, wherein the learning phase is repeated periodically according to a first repetition period, and wherein the monitoring phase is repeated periodically according to a second repetition period that is longer than the first repetition period.

8. The method according to claim 1, wherein the machine includes a vibration sensor for measuring vibratory signals, the method further comprising calibration the vibration sensor.

9. A device installable on a machine generating vibrations, the device comprising:
    a vibration sensor configured to acquire a vibratory signal;
    a microcontroller configured to:
        collect, during a learning phase, a first vibratory signal generated by the machine during its normal operation, the first vibratory signal being collected in the time domain, the learning phase repeated periodically according to a first repetition period,
        apply a transformation to the first vibratory signal to create a first vibratory signature,
        create a knowledge base by recording the first vibratory signature therein, the recording being in response to a first similarity rate between the first vibratory signature and each vibratory signature in the knowledge base being less than a predetermined first threshold,
        collect, during a monitoring phase, a second vibratory signal generated by the machine in the time domain, the monitoring phase repeated periodically according to a second repetition period that is longer than the first repetition period, apply a transformation to the second vibratory signal to create a second vibratory signature, and generate a warning in response to a second similarity rate between the second vibratory signature and each of the vibratory signatures in the knowledge base being less than a predetermined second threshold, the warning indicating an anomaly related to the second vibratory signature, wherein the predetermined second threshold is less than the predetermined first threshold; and a memory configured to record vibratory signals.

10. The device according to claim 9, wherein the microcontroller is configured to:

periodically perform the learning phase to create the knowledge base;

autonomously switch from the learning phase into the monitoring phase in response to the knowledge base being considered to have been created; and periodically perform the monitoring phase.

11. The device according to claim 9, wherein the machine is a motor, a pump, a compressor, a fan, or a turbine.

12. The device according to claim 9, wherein the learning phase further comprises comparing the first similarity rate of a predetermined number M of vibratory signatures determined consecutively with a predetermined specific threshold greater than the predetermined first threshold, the knowledge base considered as being created in response to the first similarity rate of the last M vibratory signatures being greater than the predetermined specific threshold.

13. The device according to claim 9, wherein the microcontroller is further configured to periodically transmit an analysis report during the monitoring phase.

14. A machine comprising:

a component that generates a vibration during operation;

a vibration sensor configured to acquire a vibratory signal of the component;

a memory storing a program; and a microcontroller coupled to the memory to execute the program to:

collect, during a learning phase, a first vibratory signal generated by the machine during its normal operation, the first vibratory signal being collected in the time domain, the learning phase repeated periodically, apply a transformation to the first vibratory signal to create a first vibratory signature, create a knowledge base by recording the first vibratory signature therein, the recording being in response to a first similarity rate between the first vibratory signature and each vibratory signature in the knowledge base being less than a predetermined first threshold, collect, during a monitoring phase, a second vibratory signal generated by the machine in the time domain, the machine autonomously switching from the learning phase to the monitoring phase in response to a creation of the knowledge base, apply a transformation to the second vibratory signal to create a second vibratory signature, and generate a warning in response to a second similarity rate between the second vibratory signature and each of the vibratory signatures in the knowledge base being less than a predetermined second threshold, the warning indicating an anomaly related to the second vibratory signature, wherein the predetermined second threshold is less than the predetermined first threshold.

15. The machine according to claim 14, further comprising a second memory coupled to the microcontroller and configured to store the knowledge base.

16. The machine according to claim 14, wherein the machine is a motor, a pump, a compressor, a fan, or a turbine.

17. The machine according to claim 14, wherein the learning phase further comprises comparing the first similarity rate of a predetermined number M of vibratory signatures determined consecutively with a predetermined specific threshold greater than the predetermined first threshold, the knowledge base considered as being created in response to the first similarity rate of the last M vibratory signatures being greater than the predetermined specific threshold.

18. The machine according to claim 14, wherein the monitoring phase includes a discovery phase during which a third vibratory signature that is considered as revealing the anomaly being recorded in the knowledge base without generating the warning.

19. The machine according to claim 14, wherein the monitoring phase includes comparing a duration of the anomaly with a predetermined duration, the anomaly being acknowledged in response to the duration being greater than the predetermined duration.

20. The machine according to claim 14, wherein the monitoring phase further comprises:

transmitting the warning; and periodically transmitting an analysis report.

\* \* \* \* \*